United States Patent [19]

Ryu

[11] Patent Number: 5,497,054
[45] Date of Patent: Mar. 5, 1996

[54] AUTOMATIC DIGITAL CONVERGENCE CORRECTING METHOD AND APPARATUS THEREFOR

[75] Inventor: Kyeong-keol Ryu, Seoul, Rep. of Korea

[73] Assignee: Samsung Electronics Co., Ltd., Kyungki, Rep. of Korea

[21] Appl. No.: 298,743

[22] Filed: Aug. 31, 1994

[30] Foreign Application Priority Data

Aug. 31, 1993 [KR] Rep. of Korea ................. 1993-17547

[51] Int. Cl.⁶ ................................................ H01J 29/51
[52] U.S. Cl. ..................... 315/368.11; 348/745; 348/807
[58] Field of Search ................... 315/368.11, 368.12; 348/807, 745

[56] References Cited

U.S. PATENT DOCUMENTS

| | | | |
|---|---|---|---|
| 4,999,703 | 3/1991 | Henderson | 315/368 |
| 5,020,116 | 5/1991 | Macaulay | 382/44 |
| 5,345,262 | 9/1994 | Yee et al. | 348/177 |

*Primary Examiner*—Theodore M. Blum
*Attorney, Agent, or Firm*—Sughrue, Mion, Zinn, Macpeak & Seas

[57] ABSTRACT

In an automatic digital convergence correction method and apparatus therefore employing a CRT-type display, the vertical and horizontal convergence with respect to the red and green CRTs are tracked based on the ideal seed point within a test pattern generated via the green CRT so that the vertical and horizontal convergence match, to thereby enhance the accuracy of a correction operation and reduce the correction time.

9 Claims, 5 Drawing Sheets

FIG. 1
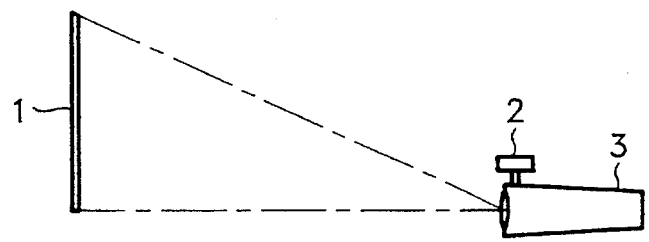
FIG. 2
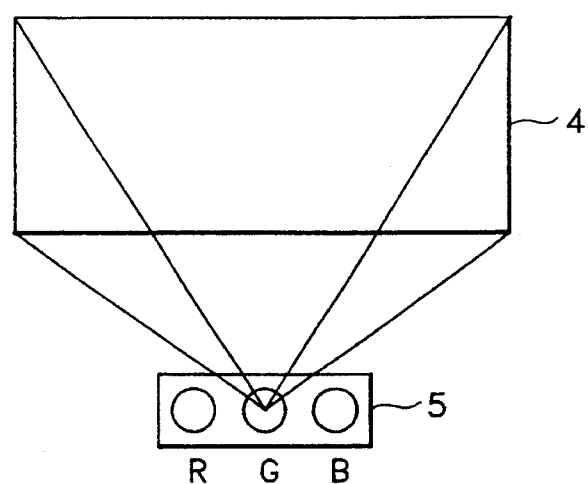
FIG. 3B
FIG. 3A
FIG. 3C
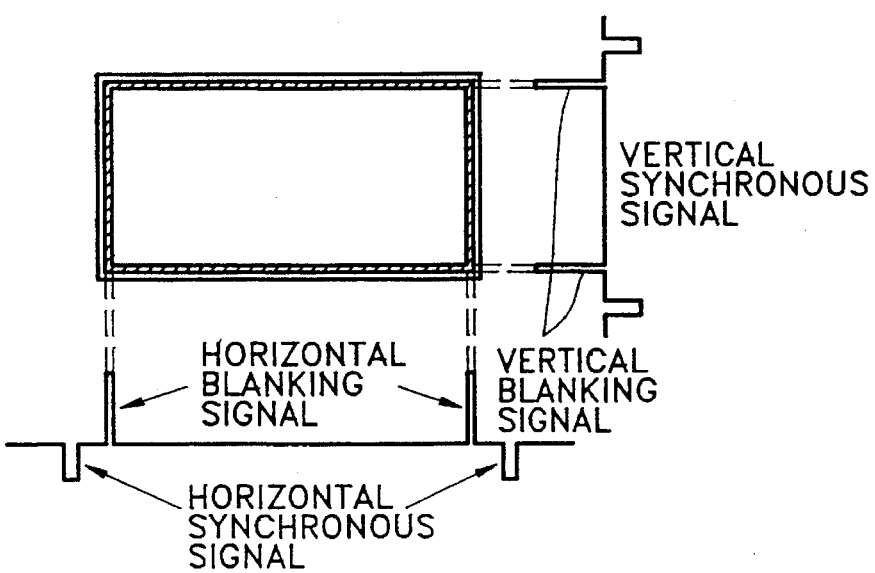

AUTOMATIC DIGITAL CONVERGENCE CORRECTING METHOD AND APPARATUS THEREFOR

BACKGROUND OF THE INVENTION

The present invention relates to an automatic digital convergence correcting method and associated apparatus for use in a display that employs a cathode ray tube (CRT), and more particularly, to an automatic digital convergence correcting method and associated apparatus for processing a signal so as to produce a correction signal which automatically corrects misconvergence of a CRT.

In general, convergence in displays such as a CRT projector or projection television involves three electron beams (R, G and B) respectively emitted from three CRTs which are focused onto the same point on a shadow mask. Convergence must be corrected for two reasons: first, since the beam starting points are different due to the offset location of the three CRTs, the red, green and blue components of the displayed image are not correctly combined. As a result, the desired color may not be obtained. Second, since the distance from a deflection center point to a shadow mask screen or fluorescent screen differs depending on the screen shape, the adjacent fluorescent material cannot emit light, so that the proper color may not be achieved or the color may vary undesirably.

To achieve convergence, three pairs of U-shaped ferrite cores are wound with a horizontal convergence coil and a vertical convergence coil and are disposed in the neck of a cathode ray tube at 120° intervals, so that the three electron beams can be converged onto the same point of a shadow mask screen (or fluorescent screen) for image display. In addition, permanent magnets are provided around convergence yokes which are disposed in the neck of a cathode ray tube at 120° intervals. The permanent magnets which are inserted into the convergence yoke are employed for a static convergence, which primarily involves convergence at the center of the screen. A dynamic convergence where the environment of the screen is converged is realized by cyclically applying a predetermined parabolic current into a horizontal/vertical convergence coil.

However, even though correction time is short, the conventional analog convergence correcting method has a problem in that, when precise correction is necessary, the circuit therefor is overly complicated.

Accordingly, a digital convergence correcting method is introduced in order to improve the analog convergence correcting method. Although the digital processing of the digital convergence correcting method enables a precise convergence correction, precise correction is time consuming and complicated because a convergence correction is performed by manually moving the display. Additionally, a front-type projector needs to correct the convergence for every movement thereof.

U.S. Pat. No. 4,999,703 discloses an automatic image correcting method and apparatus therefor which employ a CRT for automatically controlling the convergence of a primary color image by sensing the test pattern location via an optical sensor for sensing the light reflected from a screen onto which a test pattern for each primary color image is irradiated.

SUMMARY OF THE INVENTION

To overcome the above problems, it is an object of the present invention to provide an automatic digital convergence correcting method which shortens correction time and performs a precise correction in a display employing plural CRTs.

It is another object of the present invention to provide in a front-type projector an automatic convergence correcting method by employing a horizontal/vertical tracking reference pattern generated by a green CRT based on a predetermined size of a seed point and a tracking pattern generated by a red CRT and a blue CRT at a point corresponding to the horizontal/vertical tracking reference pattern.

It is still another object of the present invention to provide an apparatus most suitable for realizing the above automatic digital convergence correcting method.

To accomplish the above object of the present invention, there is provided an automatic digital convergence correcting method which corrects the convergence of a display employing red, green and blue CRTs, the method comprising the steps of:

generating a box test pattern via the green CRT so as to adjust the geometrical position of a projector with respect to a screen and generating predetermined-numbers of seed points in a box test pattern;

generating a horizontal/vertical tracking reference pattern that passes through the seed point at a predetermined location generated via the green CRT in the seed-point generating step; and tracking a horizontal/vertical tracking reference pattern generated in the tracking reference pattern generating step by employing a tracking pattern generated via the red CRT and the blue CRT at the seed point of a predetermined location.

In addition, there is provided an automatic digital convergence correcting apparatus in a display employing red, green and blue CRTs, the apparatus comprising:

a test pattern memory for generating a green-CRT-based box test pattern for adjusting the geometric position between a screen and the display, a horizontal/vertical tracking reference pattern from each of a predetermined number of seed points by employing the box test pattern, and a tracking pattern via red and blue CRTs from a seed point corresponding to the green seed point;

pickup means for picking up a box test pattern, the horizontal/vertical tracking reference patterns and a tracking pattern which are displayed onto a screen after being output from the test pattern memory;

reference signal generating means for generating a first reference signal of a horizontal/vertical tracking reference pattern, and a second reference signal of a tracking pattern, which are output from the pickup means;

controlling means for counting and comparing the first and second reference signals output from the reference signal generating means; and convergence correcting means for storing convergence correcting data in response to the comparison result of the controlling means, and for converting the data into an analog signal, and for outputting the result.

BRIEF DESCRIPTION OF THE DRAWINGS

The above objects and advantages of the present invention will become more apparent by describing in detail a preferred embodiment thereof with reference to the attached drawings in which:

FIG. 1 illustrates the location of a camera and projector with respect to a screen;

FIG. 2 illustrates the geometrical positioning between red, green and blue CRTs and a screen;

FIGS. 3A, 3B and 3C illustrate a geometrical box test pattern and the resulting signal waveform;

DETAILED DESCRIPTION OF THE INVENTION

Figure 4:
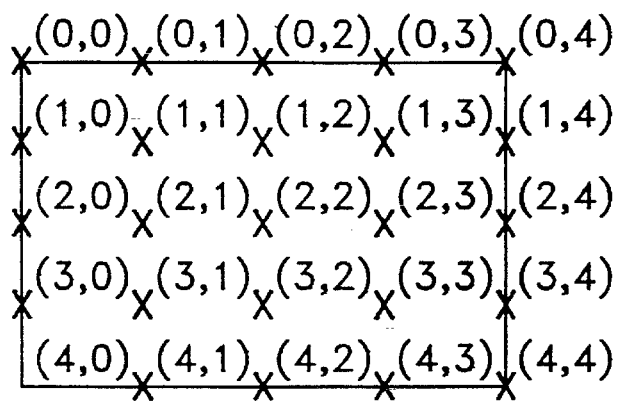
FIG. 4 is a diagram showing an embodiment of a seed point generated within a box test pattern.

The present invention will be explained in more detail with reference to the attached drawings, whereby an embodiment of a front-type projector in a display will be explained.

FIG. 1 illustrates the location of a camera and projector with respect to a screen. Here, reference numeral 1 denotes a screen, 2 denotes a charge-coupled device (CCD) camera, and 3 denotes a projector.

FIG. 2 illustrates the geometrical positioning between red, green and blue CRTs and a screen. Here, reference numeral 4 denotes a screen, and 5 indicates the three CRTs (red, green and blue).

FIGS. 3A, 3B and 3C illustrate a geometrical box test pattern and the resulting signal waveform. Here, FIG. 3A shows a geometrical box test pattern, FIG. 3B illustrates a signal waveform generated according to the vertical axis of the box test pattern, and FIG. 3C illustrates a signal waveform generated according to the horizontal axis of the box test pattern.

FIG. 4 is a diagram showing an ideal seed point generated within a box test pattern, wherein a 5×5 pixel is exemplified.

Figure 5A:
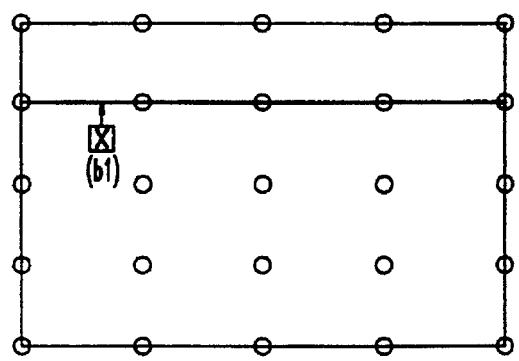
FIG. 5A and FIG. 5B illustrate a vertical/horizontal tracking reference pattern and a tracking cursor generated from a predetermined seed point.
Figure 5B:
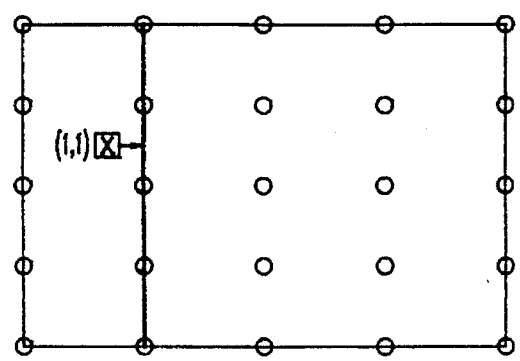

FIG. 5A illustrates a tracking reference pattern of the horizontal line (hereinafter, called a "vertical tracking reference pattern") generated based on a green seed point which has coordinates (1,1) in order to correct vertical convergence with the green as a standard with respect to the red or blue color, and illustrates a tracking cursor output via a red CRT or a blue CRT. FIG. 5B illustrates a tracking reference pattern of the vertical line (hereinafter, called a "horizontal tracking reference pattern") generated based on a green seed point which has coordinates (1,1) in order to correct horizontal convergence with the green as a standard with respect to the red or blue color, and illustrates a tracking cursor output via a red CRT or a blue CRT.

Figure 6:
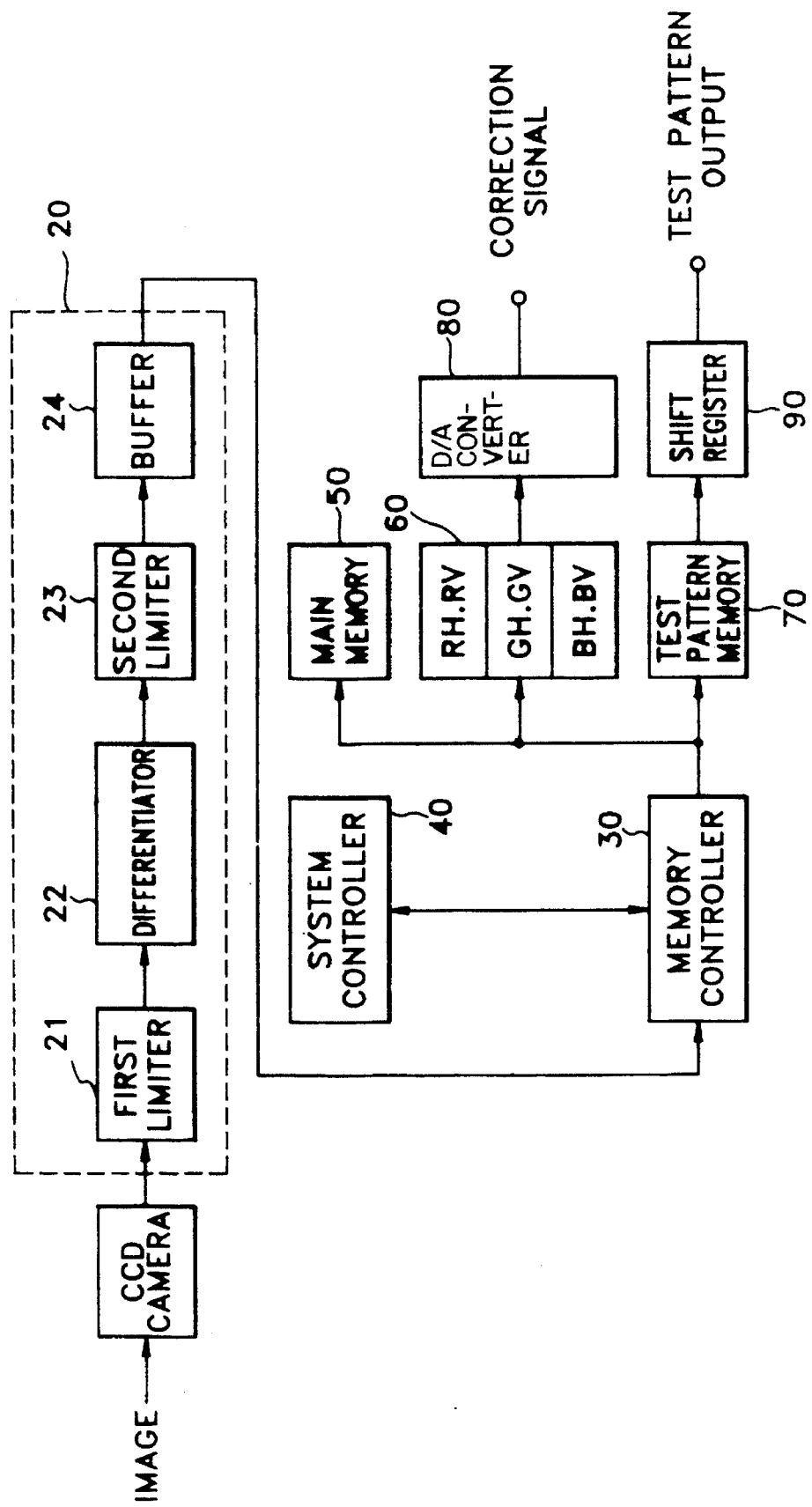
FIG. 6 is a block diagram showing an embodiment of an automatic digital convergence corrector according to the present invention.

FIG. 6 is a block diagram showing an embodiment of an automatic digital convergence corrector according to the present invention.

An automatic digital convergence correcting apparatus of FIG. 6 includes a CCD camera 10 for picking up a box test pattern displayed onto a screen, a horizontal/vertical tracking reference pattern and a tracking cursor, a reference signal generator 20 for generating a first reference signal corresponding to the horizontal (vertical) tracking reference pattern and a second reference signal corresponding to the tracking cursor picked up by CCD camera 10, a memory controller 30 for counting the first and second reference signals generated from reference signal generator 20 and for controlling memories 50, 60 and 70 depending on the counting result, a system controller 40 for counting the first and second reference signals output from memory controller 30 and determining whether the first and second reference signals are identical, a main memory 50 for storing data for operating system controller 40 via memory controller 30, a correcting memory 60 for storing the convergence correcting data via memory controller 30 in response to the counting result of the first and second reference signals under the control of system controller 40, a digital/analog converter 80 for converting the vertical/horizontal convergence correction data output from correction memory 60 into an analog signal and for outputting the analog convergence correction signal to a deflection portion (not shown), a test pattern memory 70 for storing a box test pattern for geometrically controlling the position of a projector with respect to a screen, the horizontal/vertical tracking reference pattern, the tracking cursor, a cross hatch pattern and a dot pattern, and a shifter register 90 for shifting the pattern data read from test pattern memory 70 and outputting the shifted data to a CRT.

Reference signal generator 20 includes a first limiter 21 for allowing passage of only that part of the signal which is beyond a predetermined level with respect to the horizontal (vertical) tracking reference pattern signal and the tracking cursor signal output from CCD camera 10, a differentiator 22 for differentiating the limited tracking reference pattern signal and the limited tracking cursor signal which are output from first limiter 21, a second limiter 23 for allowing passage of only that part of the signal which is beyond a predetermined level with respect to the output signal of differentiator 22, and a buffer 24 for buffering the output signal limited by second limiter 23 so as to be input to memory controller 30.

In addition, correction memory 60 includes a first region for storing vertical/horizontal convergence correction data of the electron beam output via a red CRT, a second region for storing vertical/horizontal convergence correction data of the electron beam output via a green CRT, and a third region for storing vertical/horizontal convergence correction data of the electron beam output via a blue CRT.

Figure 7:
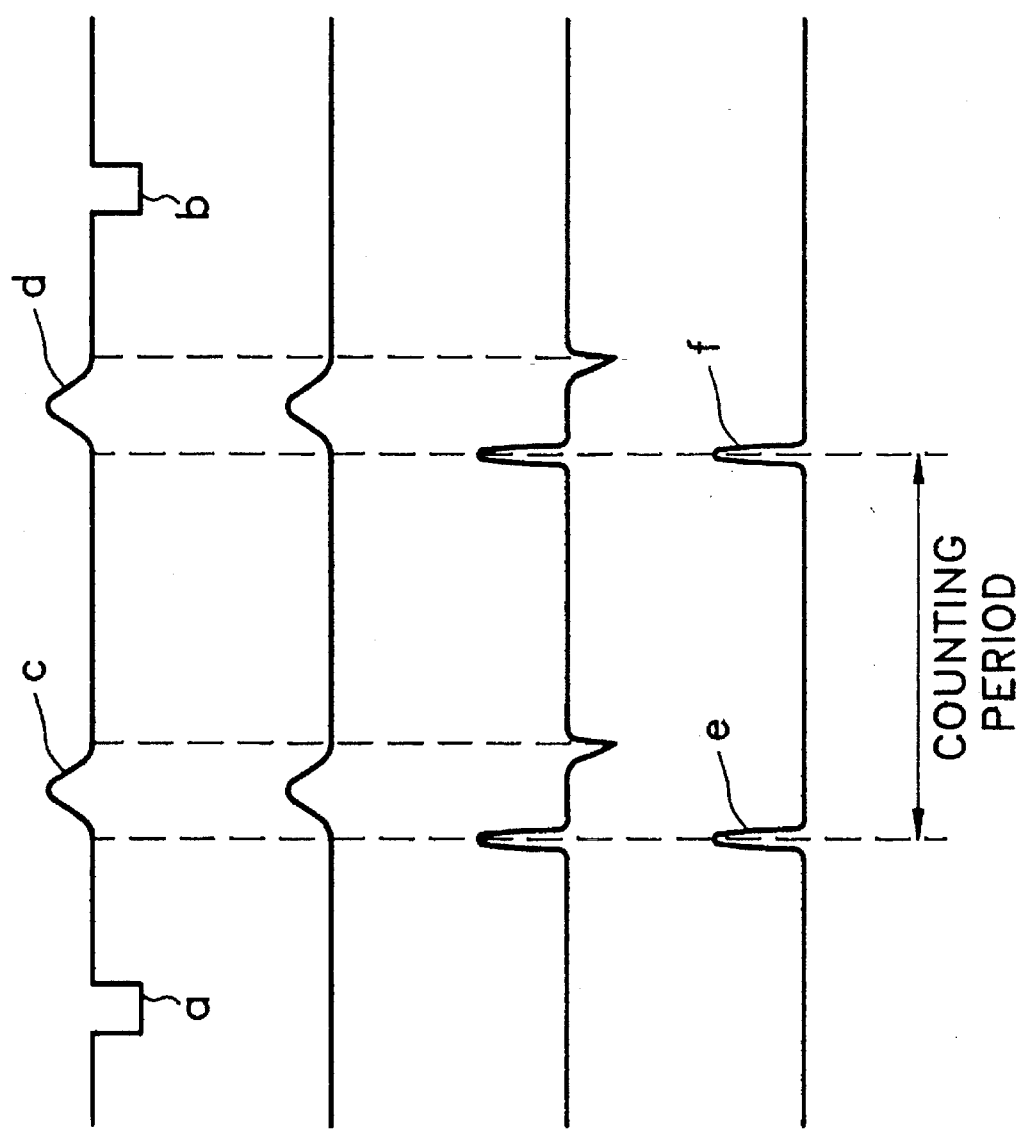
FIGS. 7A–7D illustrate operation waveforms of the reference signal generator shown in FIG. 6.

FIG. 7A to FIG. 7D illustrate operational waveforms of reference signal generator 20 shown in FIG. 6, where FIG. 7A shows the input waveform thereto (i.e., the output signal of CCD camera 10), FIG. 7B shows the output waveform of first limiter 21, FIG. 7C shows the output waveform of differentiator 22, and FIG. 7D shows the output waveform of second limiter 23.

Figure 8:
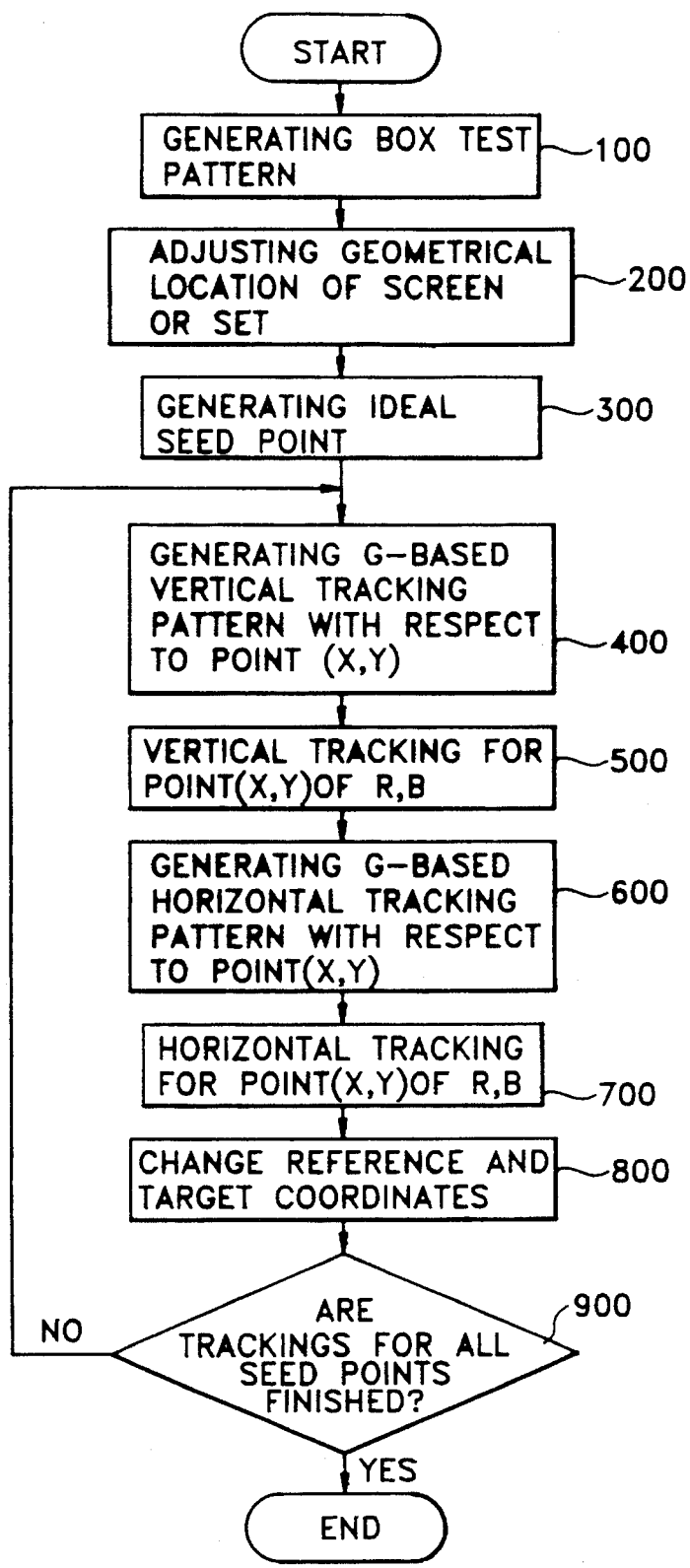
FIG. 8 is a flowchart showing an embodiment of an automatic digital convergence correcting method according to the present invention.

FIG. 8 is a flowchart of an embodiment of an automatic digital convergence correction method according to the present invention. A first series of steps (steps 100, 200 and 300) is for adjusting the geometrical position of a projector with respect to a screen by means of generating a box test pattern output via a green CRT and for generating a seed point having predetermined coordinates. A second series of steps (steps 400 and 600) is for generating a horizontal/vertical tracking reference pattern based on a green seed point generated in the above first series of steps. A third series of steps (steps 500, 700, 800 and 900) is for tracking the horizontal/vertical tracking reference pattern generated in the above second step by employing a tracking cursor generated from seed points of red and blue CRTs corresponding to the green seed point, to thereby make the red, green and blue convergence consistent.

Now, operation of the apparatus according to the present invention will be explained.

First, CCD camera 2 is installed on the green CRT (not shown) of projector 3 as shown in FIG. 1 so as to automatically correct a convergence. When CCD camera 2 is installed, a cross hatch pattern is generated via a green CRT so that the geometrical shape can be easily adjusted by employing the conventional digital convergence function. In test pattern memory 70, a box test pattern, i.e., a geometrical test pattern adjusted to fill up a screen as shown in FIG. 3A, is generated by employing a cross hatch pattern (step 100).

After step 100, a geometrical position of a screen or a set can be adjusted by employing a box test pattern (step 200).

After step 200, coordinates of the four apices of the box test pattern are read from a test pattern memory 70. Ideal seed point coordinates of a 5×5 pixel as shown in FIG. 4 are set based on the box test pattern signal shown in FIG. 3B and FIG. 3C (step 300).

After step 300, the process (steps 400 to 900) for tracking and correcting the red and blue seed points corresponding to the green seed point to be identical with each other, based on the green seed point, is performed from a seed point corresponding to coordinates (0,0) to (4,4). This process can be explained as follows.

First, for a vertical tracking for a red convergence, a vertical reference tracking pattern passing green seed point coordinate (1,1) is generated from test pattern memory 70 as shown in FIG. 5A (step 400), and a tracking cursor is generated for the red seed point coordinates (1,1) which correspond to the green seed point coordinates (1,1). The vertical tracking reference pattern and the tracking cursor are projected onto a screen via test pattern memory 70 and picked up by CCD camera 10. Then, CCD camera 10 outputs the signal having the waveform shown in FIG. 7A. At this time, the output signal of CCD camera 10 is applied to reference signal generator 20.

Here, sections a and b shown in FIG. 7A are the vertical blanking signals shown in FIG. 3B used for vertical tracking, and the horizontal blanking signals shown in FIG. 3C used for horizontal tracking, respectively. In addition, sections c and d shown in FIG. 7A are a vertical tracking reference signal and a tracking cursor signal for use in vertical tracking (FIG. 5A), and a tracking cursor signal and a horizontal tracking reference pattern signal for use in horizontal tracking (FIG. 5B), respectively.

An output signal of CCD camera 10 is applied to first limiter 21 which allows only that portion of the signal which is beyond a predetermined level to pass. Thus, the signal waveform of FIG. 7B is applied to differentiator 22. Differentiator 22 differentiates an output signal of first limiter 21 so that the signal waveform of FIG. 7C can be applied to second limiter 23. Second limiter 23 allows only that portion of the signal which is beyond a predetermined level among the output signals of differentiator 22 to pass so that the signal waveform of FIG. 7D can be applied to buffer 24. Then, buffer 24 buffers the output signal of second limiter 23 and outputs the result to memory controller 30. Memory controller 30 counts the interval between the first and second reference signals output from buffer 24 according to the reference clock. In addition, system controller 40 determines that a vertical tracking reference pattern and a tracking cursor are identical with each other when the value counted by memory controller 30 is near zero (step 500).

As result of a red convergence horizontal tracking, the horizontal tracking reference pattern that passes through green seed point coordinate (1,1) as shown in FIG. 5B is generated from test pattern memory 70 (step 600), and a tracking cursor is generated via test pattern memory 70 at the red seed point coordinates (1,1) that correspond to green seed point coordinates (1,1).

The horizontal tracking reference pattern and the tracking cursor are projected onto a screen so as to be picked up by CCD camera 10 which outputs the signal waveform of FIG. 7A. At this time, the output signal of CCD camera 10 is applied to reference signal generator 20.

In horizontal tracking, the operations of reference signal generator 20, memory controller 30 and system controller 40 are the same as those of the above-described vertical tracking, and will therefore be omitted.

System controller 40 determines that a horizontal tracking reference pattern and a tracking cursor are identical with each other when the value generated from reference signal generator 20 and determined by counting the interval between the first and second reference signals via memory controller 30 is near zero (step 700). A red convergence is corrected based on a green convergence of seed point (1,1) through the vertical tracking process (steps 400 and 600) and the horizontal tracking process (steps 500 and 700). After steps 400 to 700, the horizontal/vertical tracking reference pattern and a target seed point are changed, and the steps 400 to 700 are repeatedly performed (step 800). In the same manner, a horizontal tracking and a vertical tracking for a blue convergence can be done by performing the above process based on a green seed point, after the horizontal/vertical tracking processes for a red convergence are performed with regard to the entire seed point. After step 800, it is determined whether the tracking for all seed points is completed (step 900). If the tracking is not completed, the process returns to step 400, and if the tracking is completed, the process ends.

Here, correction memory 60 shown in FIG. 6 includes a first region for storing horizontal/vertical correction data RH and RV for a red convergence, a second region for storing horizontal/vertical correction data GH and GV for a green convergence, and a third region for storing horizontal and vertical correction data BH and BV for a blue convergence. Correction memory 60 interpolates the corrected seed data and stores the data into the respective corresponding first, second and third regions.

The corrected data is interpolated and stored in correction memory 60 since precise convergence correction is difficult to achieve when employing the ideal 5×5 seed point pattern. Even though the convergence correction is possible by using an n×n seed point pattern extended from the 5×5 seed point pattern, the corrected data is stored in correction memory 60 in order to obtain, by performing an interpolation, an effect similar to that obtained by performing a convergence with respect to the n×n seed point pattern, since the correction time period becomes longer as n becomes larger.

Digital/analog converter 80 converts the digital signal output from correction memory 60 to an analog signal and outputs the signal to a deflection portion (not shown) such that the corresponding parabola current can flow in a convergence yoke. Thus, convergence can be corrected.

The present invention can be effectively applied to a front-type projector display employing a CRT, and to a back-type projector as well.

As described above, an automatic digital convergence correction method and apparatus thereof can make the vertical convergence and the horizontal convergence with respect to a red and a blue CRT to be identical with each other by tracking an ideal seed point, by using a CCD camera, within the box test pattern generated via a green CRT in a display employing a CRT. Thus, the accuracy of the convergence correction can be enhanced and the correction operation is simplified by reducing the correction time.

What is claimed is:

1. An automatic digital convergence correction method for correcting a convergence of a display employing red, green and blue CRTs, said method comprising the steps of:

generating a box test pattern via said green CRT;

adjusting a geometrical position between a projector and a screen using said box test pattern as a reference;

generating a predetermined number of seed points within the box test pattern;

generating horizontal and vertical tracking reference patterns that pass through one of the seed points at a predetermined location, said one of the seed points being generated by said green CRT in said seed-point generating step; and tracking the horizontal and vertical tracking reference patterns generated in said tracking reference pattern generating step by employing a tracking pattern generated via said red CRT and said blue CRT at a seed point corresponding to the green seed point of said predetermined location, wherein said tracking step is performed simultaneously with said generating horizontal and vertical tracking reference patterns step by counting a time interval between a component of one of said horizontal and vertical tracking reference patterns signal and a component of a tracking pattern signal and by comparing the counted values and by making the counted values match each other.

2. An automatic digital convergence correction method according to claim 1, wherein said tracking step is performed for tracking a horizontal tracking pattern and a vertical tracking pattern by employing a charge-coupled device (CCD) type camera.

3. An automatic digital convergence correction method that corrects the convergence of a display employing red, green and blue CRTs, said method comprising the steps of:

(a) generating a box test pattern via said green CRT;

(b) adjusting a geometrical position between a projector and a screen using said box test pattern as a reference;

(c) generating a predetermined number of seed points within the box test pattern;

(d) generating a vertical tracking reference pattern that passes through one of the seed points at a predetermined location;

(e) tracking the vertical tracking reference pattern generated in said vertical tracking reference pattern generating step by employing a tracking pattern generated via said red CRT at the seed point of said predetermined location, said tracking the vertical tracking reference pattern step being performed simultaneously with said generating a vertical tracking reference pattern step, and counting a time interval between a component of said vertical tracking reference pattern and said tracking pattern generated via said red CRT and comparing the counted values and making the counted values match each other;

(f) generating a horizontal tracking reference pattern that passes through the seed point at said predetermined location and which is generated via said green CRT in said seed-point generating step;

(g) tracking the horizontal tracking reference pattern generated in said horizontal tracking reference pattern generating step by employing the tracking pattern generated via said red CRT at the seed point of said predetermined location, said tracking the horizontal tracking reference pattern step being performed simultaneously with said generating a horizontal tracking reference pattern step, and counting a time interval between a component of said horizontal tracking reference pattern and said tracking pattern generated via said red CRT and comparing the counted values and making the counted values match each other;

(h) repeating said steps (d) through (g) while changing the coordinates of a target seed point when the horizontal tracking and vertical tracking of said predetermined seed point are completed; and (i) repeating steps (d) through (h) with respect to each seed point of a blue CRT when all the seed points generated via said red CRT match all the seed points generated via said green CRT.

4. An automatic digital convergence correction apparatus in a display employing red, green and blue CRTs, said apparatus comprising:

a test pattern memory for generating a green-CRT-based box test pattern for adjusting a geometric position between a screen and said display, horizontal and vertical tracking reference patterns from each of a predetermined number of seed points by employing said box test pattern, and a tracking pattern via red and blue CRTs from a seed point corresponding to said green seed point;

pickup means for picking up the box test pattern, the horizontal and vertical tracking reference patterns and a tracking pattern displayed onto a screen after being output from said test pattern memory;

reference signal generating means for generating a first reference signal of one of the horizontal and vertical tracking reference patterns, and a second reference signal of a tracking pattern, which are output from said pickup means, said first and second references signals being generated simultaneously;

controlling means for counting a time interval between corresponding components of said first and second reference signals output from said reference signal generator; and convergence correction means for storing convergence correction data generated in response to a comparison result of said controlling means and converting the stored convergence correcting data into an analog signal and for outputting the converted result.

5. An automatic digital convergence correction apparatus according to claim 4, wherein said pickup means is a CCD-type camera.

6. An automatic digital convergence correction apparatus according to claim 4, wherein said reference signal generating means comprises:

first limiting means for outputting only that portion of a signal which is beyond a predetermined level with respect to the horizontal and vertical tracking reference pattern signals and the tracking pattern signal, which are output from said pickup means;

differentiating means for differentiating the reference pattern signal and the tracking pattern signal which are output by said first limiting means; and second limiting means for outputting only that portion of a signal which is beyond a predetermined level with respect to an output signal of said differentiation means, said output of said second limiting means representing said first and second reference signals.

7. An automatic digital convergence correction apparatus according to claim 4, wherein said controlling means determines that one of said horizontal and vertical tracking reference patterns is identical to said tracking pattern if the interval between the corresponding components of the first reference signal and the second reference signal is near zero.

8. An automatic digital convergence correction apparatus according to claim 4, wherein said convergence correction means includes a first region for storing vertical and horizontal convergence correction data for said red CRT, a second region for storing vertical and horizontal convergence correction data for said green CRT, and a third region for storing vertical and horizontal convergence correction data for said blue CRT.

9. An automatic digital convergence correction apparatus according to claim 8, wherein the vertical and horizontal convergence correction data for said red, green and blue CRTs are interpolated and stored into said correction memory.

* * * * *